Nov. 16, 1937.  G. J. WIGGENHORN  2,099,157
WATER COOLER
Filed Nov. 10, 1936
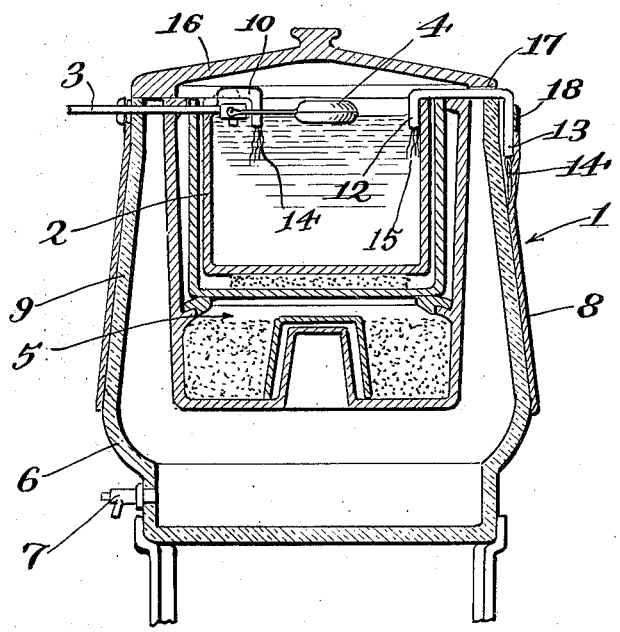
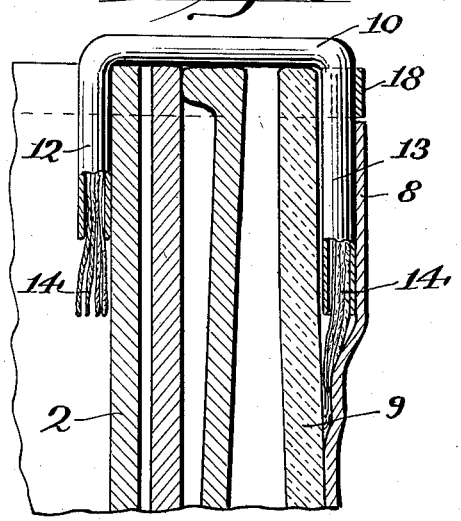
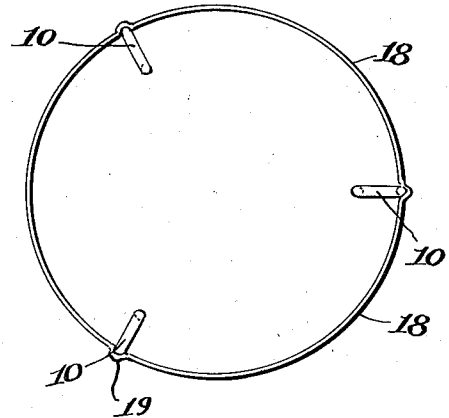
Inventor:
Guido J. Wiggenhorn,
by Hazard and Miller
Attorneys.

Patented Nov. 16, 1937

2,099,157

UNITED STATES PATENT OFFICE 2,099,157

WATER COOLER

Guido J. Wiggenhorn, South Pasadena, Calif.

Application November 10, 1936, Serial No. 110,102

3 Claims. (Cl. 62—154)

My invention relates to a water cooler especially intended for use for cooling the water in water dispensers such as are used in homes and offices in which water is stored in a container supported on a stand and provided with a faucet. One type of general use comprises a porous earthenware container which permits a slow seepage of water through the walls thereof. The heat abstracted by the evaporation of the water cools the container and the water therein. Such water coolers have not proved generally satisfactory for various reasons. The porosity of the container diminishes in time due to the clogging up of the pores due to evaporation of water and the deposit of the salts which practically all mineral waters carry. Furthermore unless the humidity is low and there is a current of air, the evaporation is usually at too slow a rate to cool effectively the water.

The present invention has for its object to provide a simple and inexpensive means whereby a quantity of water sufficient for the cooling effect is caused to envelop the side walls of the water container by means of an absorbent fibrous sheet which may be periodically replaced by fresh sheets. Simple means are provided for conducting water from the interior to the upper part of the absorbent sheet embracing the side walls of the water container.

With the above and other objects in view which will appear as the description proceeds, my invention consists in the conception and arrangement of parts hereinafter described and claimed.

In the accompanying drawing which forms part of the specification, I have illustrated a preferred embodiment of a water cooling device embodying my invention and in which:

Fig. 1 is a vertical central section of a water dispenser equipped with the improved water cooling device.

Fig. 2 is an enlarged vertical detail section showing the means conducting water from the interior of the container to the exterior side walls thereof.

Fig. 3 is a plan view of the retaining ring for holding the water supply tubes in spaced relation.

Referring to the drawing, 1 indicates a water dispenser which in this particular instance contains also water purifying and softening means such as described in U. S. Patent No. 1,889,485 granted November 29, 1932 for a Water purifier and softener. The invention however is not restricted to this type of water dispenser nor do the dispensers necessarily have any water purifying or water softening means. The type shown in the drawing consists of the water supply receptacle 2 having means to supply water thereto by means of a pipe 3. 4 is a float controlled valve mechanism maintaining the water in the supply receptacle at a predetermined level. The water purifying and softening means are indicated as a unit at 5 from which the water percolates into the water dispensing container 6, preferably made of glass, provided with a faucet.

My improved water cooling means consists of a sleeve 8 embracing snugly the side walls 9 of the water container 6. It should be noted that the side walls 9 taper upwardly so that the sleeve 8 of corresponding tapered shape will fit snugly thereon. The sleeve 8 may be of any suitable absorbent sheet material such as blotting paper. The means for conducting water from the interior of the water container consists of a series of inverted U-shaped tubes 10 which in the drawing I have shown as three in number. Each tube consists of an intermediate horizontal portion 11 and a pair of legs 12 and 13 respectively, the leg 13 being preferably longer than leg 12. Within the tubes 10 a wick 14 is placed having their ends 15 projecting from the legs 12 and 13 respectively. The shorter legs 12 of the tube are placed to extend downwardly into the body of water in supply container 2 while the horizontal portion 11 rests upon the rim of the container 6 and the longer legs 13 of the tubes 11 are disposed between the side walls 9 of the container 6 and the blotting paper sleeve 8. A removable lid 16 fits over and covers the container 6, said lid being provided with notches 17 on its outer periphery to accommodate the tubes. A tube retaining ring 18 preferably made of metal and provided with notches 19 encircles the upper end of container 6. This ring 19 cooperates with lid 16 to hold the tubes 10 firmly in spaced relation to each other and to the side walls 9 of the water container 6.

Operation:—The water in container 2 will by capillary attraction pass upwardly from the wicks 15 through the tubes 11 and downwardly through the outer legs 13 and supply sufficient water to the sleeve of blotting paper 8 to moisten the same. The water in the blotting paper will by capillary attraction quickly spread through all the parts thereof providing a moist shell offering a large surface evenly moistened to the cooling effect of evaporation. As stated before, I prefer to make the outer legs 13 somewhat longer than the inner legs 12 for the reason that a siphonic action will be facilitated by this construction as will be understood.

These water dispensers are usually serviced periodically and it is the intention to discard the old shell 8 whenever necessary and replace with a new fresh envelope of blotting paper. Likewise U shaped tubes 10 will be removed and fresh ones with new wicks inserted therein. In this manner it will be appreciated that I have provided an effective cooling means for water dispensers at a minimum expense and the least amount of work in servicing the same to keep the cooling equipment in a sanitary and effective operation.

Various changes in the construction and combination of parts may be made by those skilled in the art without departing from the spirit of my invention.

I claim:

1. A water cooler comprising a water container having a sleeve of blotting paper embracing its side walls, said container having an open top, a plurality of U shaped tubes containing wicks, said tubes having legs of unequal length, the shorter legs extending into the water container and the longer legs extending between the side walls and the blotting paper, the intermediate portions of the U shaped tubes resting upon the rim of the water container and a removable cover therefor, said cover being provided with notches to accommodate the U shaped tubes resting upon the rim of the water container.

2. A water cooler comprising a water container having a sleeve of blotting paper embracing its side walls, said container having an open top, a plurality of U shaped tubes containing wicks, said tubes having legs of unequal length, the shorter legs extending into the water container and the longer legs extending between the side walls and the blotting paper, the intermediate portions of the U shaped tubes resting upon the rim of the water container and a removable cover therefor, said cover being provided with notches to accommodate the U shaped tubes resting upon the rim of the water container and a tube retaining ring encircling the upper end of the container engaging the tubes to hold them in spaced relation to each other and to the container.

3. A water cooler comprising a water container having a sleeve of an absorbent fibrous sheet embracing its side walls, said container having an open top, a plurality of U-shaped tubes containing wicks, said tubes having legs of unequal length, the shorter legs extending into the water container and the longer legs extending between the side walls and the fibrous sheet, the intermediate portions of the U-shaped tubes resting upon the rim of the water container and a removable cover forming a joint with the rim of the water container and intermediate portions of the U-shaped tubes, and means for holding the tubes in spaced relation to each other.

GUIDO J. WIGGENHORN.